Jan. 30, 1940.                 A. CORINA                 2,188,529
                            ARTIFICIAL TREE
                         Filed March 16, 1938
FIG.1
FIG.3
FIG.4
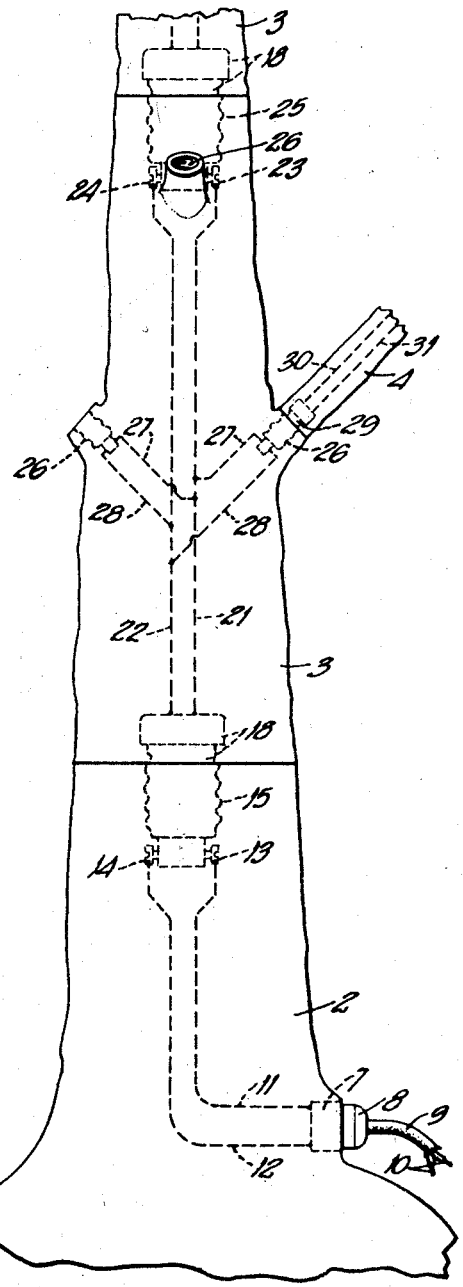
FIG.2
FIG.5
INVENTOR
Angelo Corina
by
ATTORNEY Patented Jan. 30, 1940

2,188,529

UNITED STATES PATENT OFFICE 2,188,529

ARTIFICIAL TREE

Angelo Corina, Troy, N. Y.

Application March 16, 1938, Serial No. 196,184

2 Claims. (Cl. 240—10)

My invention relates to an artificial tree comprising a plurality of sections arranged to simulate portions of a tree which sections are provided with means whereby they may be secured together and, in assembled relationship form the entire tree. My invention particularly relates to a tree of the foregoing character wherein the branches thereof are provided with incandescent lamp sockets distributed in various portions of the tree so that the tree may be illuminated by a multiplicity of preferably small incandescent lamps to provide substantially the same appearance as lighted Christmas trees.

A first object, therefore, of my invention resides in the provision of an artificial tree comprising a plurality of sections so constructed and arranged that they may be secured together to form a structure simulating a natural tree but which sections may be readily disconnected to permit compact storage thereof when not in use. Another object resides in the provision of a tree of the foregoing character wherein the various sections thereof are formed to simulate portions of a tree trunk and tree branches and which sections are provided with electrical conductors and means for connecting the sections together and electrically connecting together respective conductors thereof. Still another object lies in the provision of a tree comprising trunk and branch sections provided with electrical conductors, preferably molded therein, and means for both electrically connecting together respective conductors of said sections and for securing said sections together, the branch sections also being provided with one or a plurality of incandescent lamp sockets connected to the conductors thereof whereby, when the tree is assembled, an electrical circuit through the sections thereof and to the incandescent lamp sockets of the branches is made.

Further objects reside in the provision of an artificial, segmented tree of the foregoing character wherein the various sections thereof are molded of a preferably incombustible, electrical insulating material, the associated electrical elements and connecting means being molded therein whereby the natural appearance of the tree is enhanced due to an absence of exteriorly visible connecting means.

With these and other objects in view, my invention includes the novel elements and the combinations and arrangements thereof described below and illustrated in the accompanying drawing, in which—

Fig. 1 is an elevation view illustrating an assembled tree embodying the principles of my invention;

Fig. 2 is a fragmentary, elevation view of a plurality of sections secured together to form a portion of an artificial tree;

Figs. 3 and 4 are fragmentary, elevation and sectional elevation views, respectively, of adjacent sections illustrating a preferred form of means for connecting the sections together and electrically connecting together electrical conductors of each section; and Fig. 5 is a fragmentary, elevation view of a branch section showing incandescent lamps arranged in the sockets thereof.

In Fig. 1 of the drawing, I have shown an artificial tree assembly, which is arranged for purposes of illustration to simulate a tree of the evergreen variety. The tree, indicated generally at 1, comprises a base portion 2 and a plurality of sections 3 connected together to form the tree trunk and to the various sections 3 are secured laterally extending branch sections 4. These branch sections are provided with one or a plurality of incandescent lamp sockets, illustrated in dotted lines at 5 in Fig. 5 as molded therein, which are designed to receive incandescent lamps 6 so that the tree may be illuminated by means of a plurality of lights distributed over the branches thereof to provide substantially the same effect as now produced by employing strings of lights and arranging them upon a natural evergreen tree.

By providing an artificial tree formed of a multiplicity of sections, it is possible compactly to store the disassembled sections thereof when not in use. When, however, the tree is to be erected by securing the various sections together, it is desirable so to arrange these sections and their associated connecting means that an electrical circuit between the respective incandescent lamp sockets of the branch sections and a suitable source of electrical energy may be easily and satisfactorily completed. To this end, I have so arranged the electrical conductors of the various sections and the means associated with such sections for securing the same together that in merely securing the sections together an electrical circuit is completed therethrough and to the incandescent lamps mounted in the sockets of the branch sections.

In the embodiment illustrated, the base portion 2, as illustrated in Fig. 2, is provided with a plug receptacle 7 which is adapted to receive an electrical plug connector 8 to which is connected a lead 9 comprising electrical conductors 10 which in turn may be connected in any desired manner to a suitable source of supply. The plug and plug receptacle, of course, are not essential but are illustrative of one manner in which the conductors of the sections may be connected to a suitable lead. To the plug receptacle 7 are connected, in the usual manner, two conductors indicated in dotted lines at 11 and 12, respectively, which are also connected to terminals 13 and 14 of one element 15 of a connector for securing the section 3 to the base 2. As illustrated, the element 15 may comprise an incandescent lamp socket structure which is molded in the upper end of the base 2 and which comprises, as illustrated in Fig. 4, the usual threaded sleeve terminal 16 and centrally arranged base terminal 17. The section 3 is provided with a downwardly projecting connector element or screw plug 18 comprising a screw threaded terminal 19 and base terminal 20 arranged centrally thereof but insulated therefrom. The plug 18 is adapted to be screwed into the element 15 securely to affix the two sections together. Conductors 21 and 22 are connected to the plug 18, making electrical connection with the terminals 19 and 20 thereof in the usual manner, and are also connected to terminals 23 and 24 of an electrical connecting socket 25 arranged in the upper end of the section 3.

It will be understood that each of the trunk sections are connected together in the foregoing manner whereby the conductors of one section are electrically connected to respective conductors of another section to provide an electrical circuit. The sections 3 are also arranged to permit the tree branches to be secured thereto and the conductors of said branches to be connected to respective conductors of said trunk sections. This is accomplished as illustrated by way of example in Fig. 2. Electrical, screw threaded sockets 26 of the general nature of that indicated at 15 may be provided for this purpose and embedded or molded in the sides of the sections 3. The terminals of sockets 26 are electrically connected through conductors 27 and 28 to conductors 21 and 22, respectively. The branch sections, as illustrated in Fig. 5, are provided at one end with plug connectors 29, generally of the order of that indicated at 18, which are adapted to be screwed into the sockets 26 whereby the branch sections are secured to the trunk sections and the conductors 30 and 31 of said branches are electrically connected to the main conductors of the trunk sections.

The conductors of the branch sections 4 such as conductors 30 and 31 are electrically connected, as illustrated in Fig. 5, through branch conductors to the incandescent lamp sockets 5 which may be arranged in various sub-branches of the branch elements.

The connecting sockets for the branch sections may be arranged in any desired manner in the trunk sections 3 and preferably arranged in the manner illustrated so that the branches may be secured thereto to provide a desirable, rounded tree appearance.

From the foregoing description of my invention, it will be understood that the various tree sections may be readily disassembled and, when assembled, completed electrical circuits are automatically established through all the sections thereof and to the incandescent lamp sockets borne by the branch sections. With the electrical elements and conductors embedded or molded in the various sections in the manner illustrated there is an entire absence of any external connecting means and, furthermore, no skill whatever is required in assembling the tree and effecting a completed electrical circuit to all the incandescent lamp sockets mounted in the branches thereof. It is merely necessary to secure the various sections of the tree together, screw the incandescent lamps into the sockets therefor and electrically connect the plug receptacle in the base of the tree with a suitable source of electrical energy.

In fabricating the sections of which the tree is comprised, I prefer to employ any moldable material such as Bakelite, hard rubber and other suitable plastics which, preferably, are of an incombustible and electrically insulating character whereby possibilities of short circuiting the conductors or a conflagration arising therefrom are entirely precluded. Furthermore, by molding the sections, decorative features may be incorporated therein either as an integrally molded structure or as simulated tree portions having elements providing decorative features molded therein.

Although I have illustrated and described a particular form of means for connecting the tree sections together and electrically connecting the conductors thereof whereby to provide a completed electrical circuit extending throughout various portions of the assembled tree, it will be understood that means may be provided for connecting the sections together which may or may not comprise the electrical connecting means. Furthermore, other electrical connecting means such, for example, as a pronged plug and plug socket arrangement may be employed. The means illustrated, however, serve not only as efficient means for effecting an electrical interconnection of the various conductors but also functions securely to affix said sections together in assembled relationship.

It should also be understood that the electrical circuit so formed by the conductors may be arranged to provide either parallel or series or series parallel connections across a power supply.

Hence, while I have described my invention in its preferred embodiment, it is to be understood that the words which I have used are words of description rather than of limitation and that changes within the purview of the appended claims may be made without departing from the true scope and spirit of my invention in its broader aspects.

What I claim is:

1. In an artificial tree of the character described, a plurality of separable trunk sections and limb sections having electrical outlets thereon arranged to simulate portions of a tree; each of said trunk sections being molded and having embedded therein electrical conductors and associated screw threaded means for both electrically and mechanically connecting said trunk sections and limb sections together in tree forming relationship, said means forming male and female connectors so correlated and arranged as always to connect and lock respective sections together with surface zones of one section substantially in the same relation to those of another section and to prevent separation of said sections when said screw threaded means are tightly screwed together whereby positively to lock said sections together in predetermined, relative relationship.

2. In an artificial tree of the character described, a plurality of separable trunk sections and limb sections having electrical outlets thereon arranged to simulate portions of a tree; each of said sections being molded and having embedded therein electrical conductors and associated screw threaded means for both electrically connecting said conductors and mechanically connecting and locking said sections together in tree forming relationship, said sections having at their connecting ends an extended flat bearing surface surrounding said screw threaded means whereby respective sections may be fastened together with the flat bearing surfaces of the sections in abutting relationship to form mutual support, said screw threaded means being adapted to fasten said sections together in predetermined relationship against separation.

ANGELO CORINA.